(12) United States Patent
Yamada

(10) Patent No.: US 12,314,615 B2
(45) Date of Patent: May 27, 2025

(54) COMPUTER-READABLE STORAGE MEDIUM, INFORMATION PROCESSING DEVICE, AND METHOD FOR AUTOMATICALLY SETTING PARTICULAR PROCESSING

(71) Applicant: BROTHER KOGYO KABUSHIKI KAISHA, Nagoya (JP)

(72) Inventor: Kazutaka Yamada, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/356,630

(22) Filed: Jul. 21, 2023

(65) Prior Publication Data

US 2024/0020071 A1    Jan. 18, 2024

Related U.S. Application Data

(63) Continuation of application No. PCT/JP2022/001537, filed on Jan. 18, 2022.

(30) Foreign Application Priority Data

Jan. 29, 2021  (JP) .................... 2021-012774

(51) Int. Cl.
    *G06F 3/12*   (2006.01)
    *B41J 29/38*  (2006.01)
    *G06K 15/02*  (2006.01)

(52) U.S. Cl.
    CPC ............ *G06F 3/1254* (2013.01); *B41J 29/38* (2013.01); *G06F 3/1204* (2013.01);
    (Continued)

(58) Field of Classification Search
    None
    See application file for complete search history.

(56) References Cited

U.S. PATENT DOCUMENTS

2002/0156947 A1  10/2002  Nishio
2012/0246288 A1   9/2012  Kikuoka
(Continued)

FOREIGN PATENT DOCUMENTS

JP   2007080280 A    3/2007
JP   2012203493 A   10/2012
(Continued)

OTHER PUBLICATIONS

International Preliminary Report on Patentability and Written Opinion from PCT/JP2022/001537 dated Jul. 31, 2023 together with English language translations.
(Continued)

*Primary Examiner* — Lennin R Rodriguezgonzalez
(74) *Attorney, Agent, or Firm* — Scully, Scott, Murphy & Presser, P.C.

(57) ABSTRACT

A non-transitory computer-readable storage medium stores computer-readable instructions that are executable by a computer of an information processing device and conform to a printer connected with the information processing device. The instructions cause, when executed by the computer, the information processing device to obtain, from an external device connected with the information processing device, automatic setting information indicating whether particular processing is to be performed on a target image to be printed, and to perform, in response to a print instruction being output from an application program incorporated in the information processing device to a general-purpose print program incorporated in advance in an operating system of the information processing device, an automatic setting execution process to configure print settings to perform the particular processing on the target image to be printed, when the automatic setting information obtained indicates that the particular processing is to be performed on the target image.

12 Claims, 8 Drawing Sheets

(52) U.S. Cl.
CPC .......... *G06F 3/1222* (2013.01); *G06F 3/1238* (2013.01); *G06F 3/1274* (2013.01); *G06K 15/1809* (2013.01)

(56) References Cited

U.S. PATENT DOCUMENTS

| | | |
|---|---|---|
| 2016/0162226 A1 | 6/2016 | Suzuki |
| 2020/0110559 A1 | 4/2020 | Natori |
| 2020/0174724 A1 | 6/2020 | Yamada |
| 2020/0249881 A1* | 8/2020 | Hosomizo ............. G06F 3/1232 |

FOREIGN PATENT DOCUMENTS

| | | |
|---|---|---|
| JP | 2016110519 A | 6/2016 |
| JP | 2020060849 A | 4/2020 |
| JP | 2020087273 A | 6/2020 |

OTHER PUBLICATIONS

International Search Report dated Apr. 26, 2022 issued in PCT/JP2022/001537.
Notice of Reasons for Refusal dated Aug. 6, 2024 received in Japanese Patent Application No. 2021-012774.

* cited by examiner

COMPUTER-READABLE STORAGE MEDIUM, INFORMATION PROCESSING DEVICE, AND METHOD FOR AUTOMATICALLY SETTING PARTICULAR PROCESSING

REFERENCE TO RELATED APPLICATIONS

This application is a continuation of PCT International Application No. PCT/JP2022/001537 filed on Jan. 18, 2022, and claims priority from Japanese Patent Application No. 2021-012774 filed on Jan. 29, 2021, which is incorporated herein by reference in its entirety.

BACKGROUND ART

As a technology for controlling a printer from an information processing device such as a personal computer, a configuration in which forced print settings are configured by a printer driver has been known. For instance, a technology has been disclosed in which when a system administrator describes, in an installation configuration file, print settings that the system administrator wishes to enforce, and provides a user with an installation package containing the installation configuration file, and the user installs a printer driver on an information processing device using the installation package, a print queue, conforming to the printer driver and reflecting the print settings to be enforced, is generated in the information processing device. In another instance, a technology has been disclosed in which the information processing device receives a user's input of the print settings to be enforced while an installation program is being executed, instead of using the installation configuration file.

DESCRIPTION

In recent years, a technology has been put to practical use in which a printer is controlled by a print program that is incorporated as standard into an operating system (hereinafter referred to as an "OS") of an information processing device, without using a printer driver as described above. In this technology, the OS associates the printer with the OS-standard print program, and thereafter, the information processing device is enabled to cause the printer to perform printing with the OS-standard print program without using a printer driver in response to receiving a print instruction to the printer.

As mentioned above, the technology in which the forced print settings are configured by the printer driver is known. In this technology, it is required for the system administrator to prepare the installation configuration file in such a manner that the forced print settings are configured, or for the user to enter such forced print settings at the time of installing the printer driver on the information processing device. These required operations are time-consuming and inconvenient for the system administrator and the user. Even if the aforementioned OS-standard general-purpose print program is used to configure such forced print settings, the setup work therefor is still time-consuming and inconvenient. Thus, there is room for improvement in the configuration of such forced print settings.

Aspects of the present disclosure are advantageous for providing one or more improved techniques for reducing the time and effort required to configure forced print settings in a case where an information processing device, into which an OS-standard general-purpose print program is incorporated, causes a particular printer to perform printing.

According to aspects of the present disclosure, a non-transitory computer-readable storage medium is provided, which stores computer-readable instructions that are executable by a computer of an information processing device and conform to a printer connected with the information processing device. The instructions are configured to, when executed by the computer, cause the information processing device to obtain automatic setting information stored in an external device connected with the information processing device. The automatic setting information indicates whether particular processing is to be performed on a target image to be printed. The instructions are further configured to, when executed by the computer, cause the information processing device to, in response to a print instruction to cause the printer to print the target image being output from an application program incorporated in the information processing device to a general-purpose print program incorporated in advance in an operating system of the information processing device, perform an automatic setting execution process to configure print settings to perform the particular processing on the target image to be printed, when the automatic setting information obtained indicates that the particular processing is to be performed on the target image.

According to aspects of the present disclosure, further provided is an information processing device that includes a communication interface and a controller. The controller includes a processor and a non-transitory computer-readable storage medium. The non-transitory computer-readable storage medium stores an application program, a general-purpose print program, and computer-readable instructions. The general-purpose print program is incorporated in advance in an operating system of the information processing device. The instructions conform to a printer connected with the information processing device via the communication interface. The instructions are configured to, when executed by the processor, cause the controller to obtain automatic setting information stored in an external device connected with the information processing device via the communication interface. The automatic setting information indicates whether particular processing is to be performed on a target image to be printed. The instructions are further configured to, when executed by the processor, cause the controller to, in response to a print instruction to cause the printer to print the target image being output from the application program to the general-purpose print program, perform an automatic setting execution process to configure print settings to perform the particular processing on the target image to be printed, when the automatic setting information obtained indicates that the particular processing is to be performed on the target image.

According to aspects of the present disclosure, further provided is a method implementable by a processor executing computer-readable instructions on an information processing device. The instructions conform to a printer connected with the information processing device. The method includes obtaining automatic setting information stored in an external device connected with the information processing device. The automatic setting information indicates whether particular processing is to be performed on a target image to be printed. The method further includes performing, in response to a print instruction to cause the printer to print the target image being output from an application program incorporated in the information processing device to a general-purpose print program incorporated in advance in an operating system of the information processing device, an automatic setting execution process to configure print settings to perform the particular processing on the target image to be printed, when the automatic setting information obtained indicates that the particular processing is to be performed on the target image.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A detailed explanation will be provided below of a personal computer (hereinafter referred to as a "PC") using a support program in an illustrative embodiment according to aspects of the present disclosure, with reference to the accompanying drawings. In the present disclosure, a support program executable by the PC connected with a printer having a printing function is described.

Figure 1:
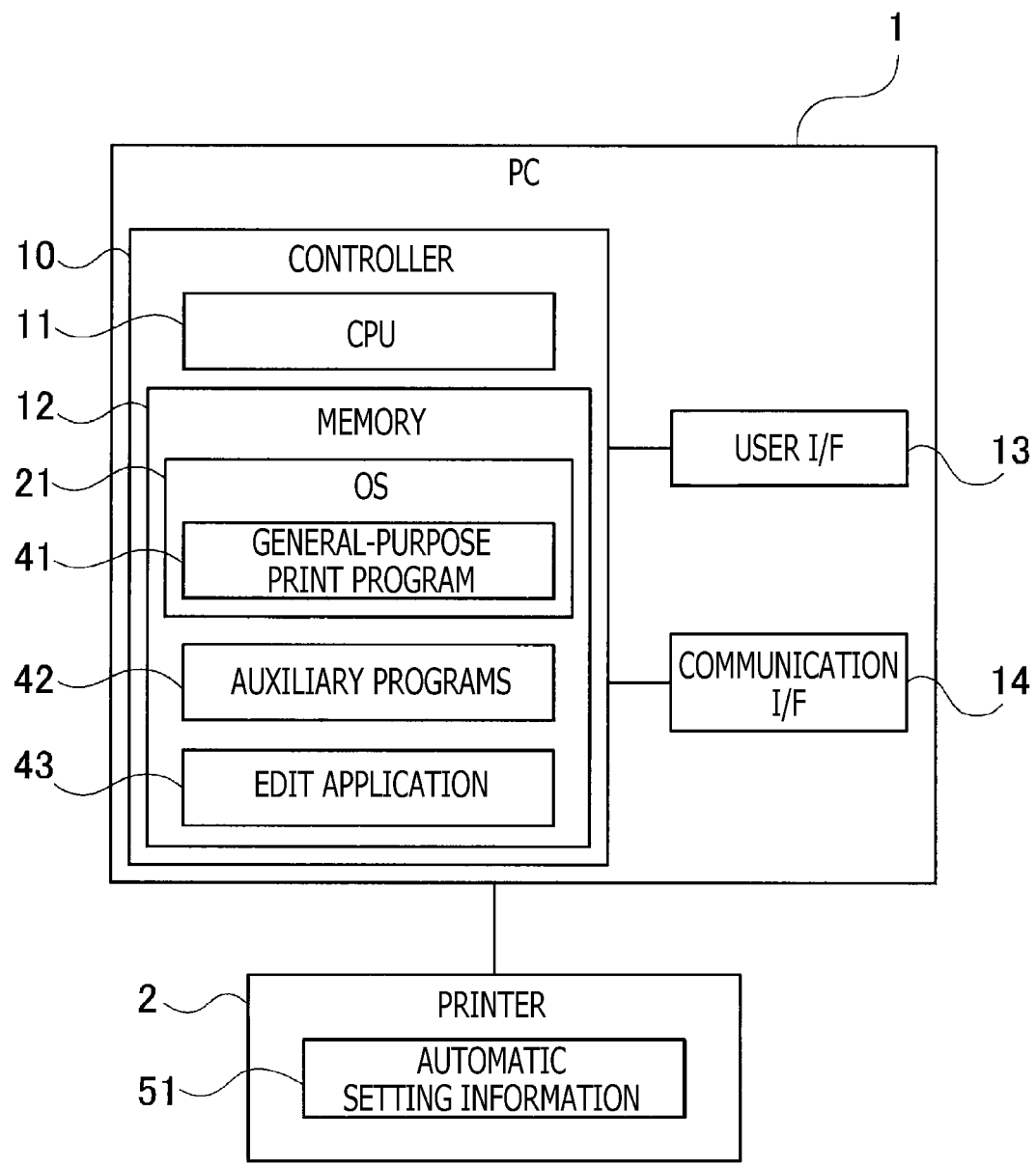
FIG. 1 is a block diagram schematically showing an electrical configuration of a PC.

As shown in FIG. 1, a PC 1 of the illustrative embodiment has a controller 10 that includes a CPU 11 and a memory 12. The PC 1 may be an example of an "information processing device" according to aspects of the present disclosure. The CPU 11 may be an example of a "processor" according to aspects of the present disclosure. The PC 1 further includes a user interface (hereinafter referred to as a "user I/F") 13 and a communication interface (hereinafter referred to as a "communication I/F") 14, which are electrically connected with the controller 10. The controller 10 shown in FIG. 1 is a collective term for hardware and software used to control the PC 1, and may not necessarily represent a single hardware element actually existing in the PC 1.

The CPU 11 is configured to perform various processes according to programs read from the memory 12 and based on user operations. The memory 12 stores various types of data and various programs including various application programs (hereinafter, which may be referred to as "applications"). The memory 12 is also used as a work area when various processes are performed. A buffer provided to the CPU 11 may be an example of a "memory" according to aspects of the present disclosure. Examples of the memory 12 are not limited to ROMs, RAMs, or HDDs, but may include storage media (e.g., CD-ROMs and DVD-ROMs) that are readable and writable by the CPU 11.

The user I/F 13 includes hardware configured to display screens to provide information to the user, and hardware configured to receive user operations. The user I/F 13 may have a combination of a display configured to display information, and a mouse and a keyboard that are configured to receive user input operations. The user I/F 13 may include a touch panel configured to display information and receive user input operations.

The communication I/F 14 includes hardware configured to communicate with external devices such as a printer 2. Communication standards applicable for the communication I/F 14 include Ethernet ("Ethernet" is a registered trademark of Fuji Xerox Co., Ltd.), Wi-Fi ("Wi-Fi" is a registered trademark of the non-profit Wi-Fi Alliance), and USB. The PC 1 may have a plurality of communication I/Fs 14 conforming to a plurality of communication standards.

As shown in FIG. 1, the memory 12 of the PC 1 stores an operating system (hereinafter referred to as an "OS") 21 including a general-purpose print program 41, and further stores auxiliary programs 42 and an edit application 43. The auxiliary programs 42 may be included in examples of a "support program" according to aspects of the present disclosure. The edit application 43 may be an example of an "application program" according to aspects of the present disclosure. Examples of the OS 21 may include Windows ("Windows" is a registered trademark of Microsoft Corporation), macOS ("macOS" is a registered trademark of Apple Inc.), Linux ("Linux" is a registered trademark of Linus Torvalds), iOS ("iOS" is a registered trademark of Cisco Systems, Inc.), and Android ("Android" is a registered trademark of Google LLC).

The general-purpose print program 41 is an OS-standard program for causing various types of printers (e.g., the printer 2) to perform printing based on user instructions. The general-purpose print program 41 in the illustrative embodiment is a program having a function to generate intermediate image data based on image data to be printed. For instance, the intermediate image data is XPS data.

The general-purpose print program 41 supports functions that are usable in common by a plurality of models of printers provided by a vendor of the various types of printers. The general-purpose print program 41 does not support all of the specific functions of the various types of printers. Functions supportable by the general-purpose print program 41 are limited to generic functions.

The auxiliary programs 42 include one program or a group of programs configured to, when executed by the CPU 11, cause the PC 1 to perform processing based on instructions from the OS 21, accompanying processing by the general-purpose print program 41. The auxiliary programs 42 include one or more applications that support control of a target hardware element. The auxiliary programs 42 in the illustrative embodiment conform to a model of the printer 2 connected with the PC 1. The auxiliary programs 42 are launched from the general-purpose print program 41, for instance, when the PC 1 has received an instruction to cause the printer 2 to perform printing using the general-purpose print program 41. For instance, the auxiliary programs 42 may be referred to as hardware support applications (abbreviation: HSAs).

The auxiliary programs 42 are configured to, when executed by the CPU 11, cause the PC 1 to accept a plurality of types of instructions from the general-purpose print program 41 and perform various types of processes based on the accepted instructions. The auxiliary programs 42 may include a combination of a plurality of programs each of which is configured to, when executed by the CPU 11, cause the PC 1 to accept execution instructions. The auxiliary programs 42 may include one program configured to, when executed by the CPU 11, cause the PC 1 to accept instructions and perform respective different processes according to the accepted instructions.

The auxiliary programs 42 may include a program prepared for each type of printer by the vendor of the various types of printers. For instance, the auxiliary programs 42 may include an auxiliary program prepared for inkjet printers and an auxiliary program prepared for laser printers. For instance, when a new printer is connected with the PC 1, the OS 21 causes the PC 1 to download an appropriate auxiliary program from a server or another source depending on a type of the connected printer and to incorporate the downloaded auxiliary program into the PC 1. The OS 21 then causes the PC 1 to store identification information of the incorporated auxiliary program in the memory 12 in association with printer information of the newly connected printer. It is noted that the auxiliary programs 42 may include not only the auxiliary program prepared for each type of printer but also an auxiliary program prepared for each model of printer or an auxiliary program prepared for each series of models of printers.

The edit application 43 is, for instance, an application for creating and editing image data and document data. For instance, the edit application 43 may be Microsoft Word or Microsoft PowerPoint, or may be an application provided by the vendor of the printer 2. "Microsoft" is a registered trademark of Microsoft Corporation. "PowerPoint" is a registered trademark of Microsoft Corporation. The edit application 43 is configured to accept user operations that include instructions to cause the printer 2 to perform particular operations. Specifically, for instance, the edit application 43 is configured to, when executed by the CPU 11, cause the PC 1 to accept, via the user I/F 13, a print execution instruction to cause the printer 2 to perform printing.

The printer 2 in the illustrative embodiment is a device having a printing function. The PC 1 is communicably connected with the printer 2 via the communication I/F 14. The printer 2 is configured to receive print data from an external device such as the PC 1 and perform printing based on the received print data. The printer 2 stores automatic setting information 51 in a memory of the printer 2. The automatic setting information 51 will be described later.

Figure 2:
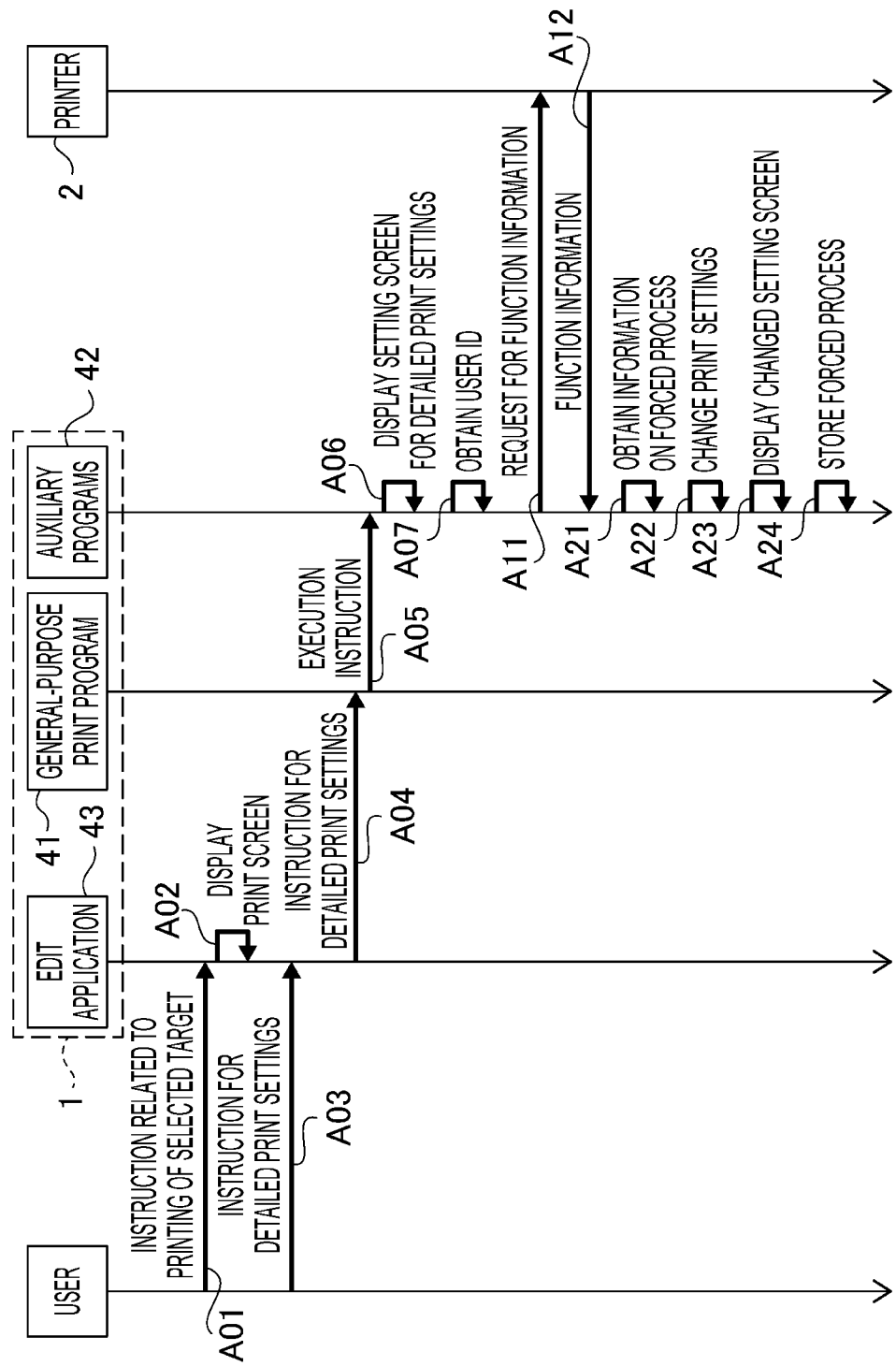
FIG. 2 is a sequence chart showing a former part of an example procedure of printing operations by individual programs.

Next, with respect to a printing procedure including operations by the auxiliary programs 42 in the illustrative embodiment, a former part thereof will be described with reference to a sequence chart in FIG. 2. FIG. 2 shows operations when the PC 1, with the auxiliary programs 42 conforming to the printer 2 incorporated therein, causes the printer 2 to perform printing using the general-purpose print program 41, by an application (e.g., the edit application 43) to receive a print instruction.

Each processing step in the processes and flowchart(s) in the illustrative embodiment basically indicates processing by the CPU 11 according to instructions described in programs such as the auxiliary programs 42. Processing by the CPU 11 also includes hardware control using an API of the OS 21. In the present disclosure, operations by each program may be described without a detailed explanation of the OS 21. In addition, "obtaining" and "acquiring" may be used as concepts that do not necessarily require a request.

The edit application 43 is configured to accept creating and editing of text, charts, figures, and other information based on user's instructions. In response to receiving an instruction related to printing of currently selected target (e.g., text, a chart, or a figure) (A01), the edit application 43 causes the user I/F 13 to display a print screen for receiving user instructions (A02). For instance, the edit application 43 receives, via the print screen, a print execution instruction, an instruction for basic print settings, and an instruction to start accepting detailed print settings.

When the edit application 43 has received an instruction to start accepting detailed print settings while the printer 2 is selected on the print screen being displayed (A03), the edit application 43 passes information on the received instruction to start accepting detailed print settings to the OS 21. When the OS 21 has received the information on the instruction to start accepting detailed print settings for printing using the general-purpose print program 41, the OS 21 activates the general-purpose print program 41 and provides the instruction to start accepting detailed print settings to the general-purpose print program 41 (A04). In response to receiving the instruction to start accepting detailed print settings, the general-purpose print program 41 provides an execution instruction to accept detailed print settings to the auxiliary programs 42 conforming to the printer 2 as currently selected (A05).

Figure 3:
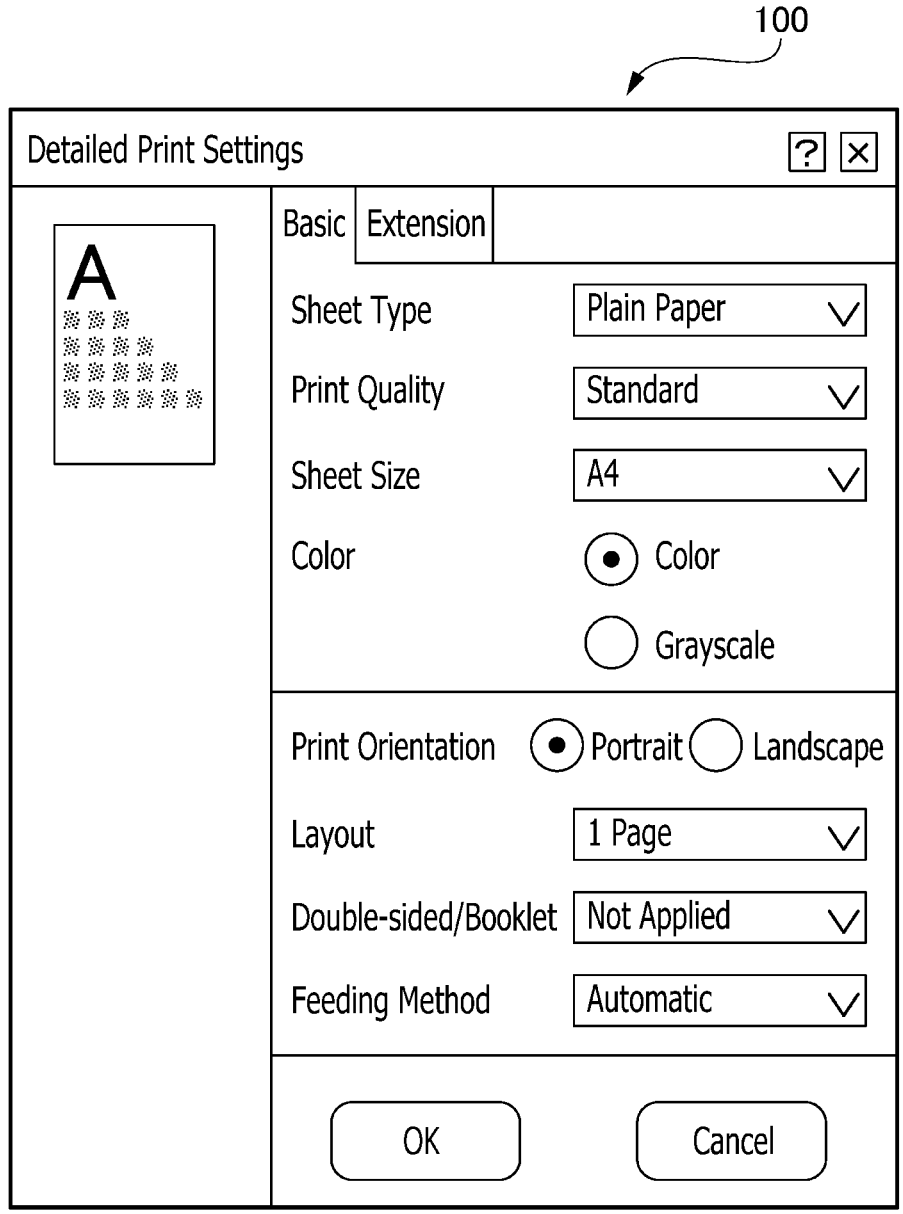
FIG. 3 shows an example of a setting screen.

The auxiliary programs 42 start operating based on the execution instruction from the general-purpose print program 41, and cause the user I/F 13 to display a setting screen to receive input operations for detailed print settings (A06). For instance, as shown in FIG. 3, based on model information on the model of the printer 2, the auxiliary programs 42 cause the user I/F 13 to display a setting screen 100 to receive detailed print settings conformable to the model of the printer 2, and accept user operations.

In addition, the auxiliary programs 42 obtain a user ID that indicates the user who is currently logged in to the PC 1 (A07). The user ID is, for instance, a user name and is identification information for identifying the user. For instance, the auxiliary programs 42 may obtain the user ID from the OS 21, or may inquire, in A07, of the user about the user ID and receive input of the user ID.

When having caused the user I/F 13 to display the setting screen 100 in A06, the auxiliary programs 42 send an obtainment request for function information to the printer 2 via the communication I/F 14 (A11). In A11, the auxiliary programs 42 send the obtainment request with information on the user ID obtained in A07 added. The auxiliary programs 42 then receive the function information from the printer 2 (A12).

The auxiliary programs 42 may communicate directly with the printer 2, for instance, using MIB ("MIB" is an abbreviation for "Management Information Base"), or may communicate therewith via the OS 21. When the auxiliary programs 42 and the printer 2 communicate with each other via the OS 21, the auxiliary programs 42 and the printer 2 perform communication conforming to a communication protocol of the OS 21, such as IPP ("IPP" is an abbreviation for "Internet Printing Protocol").

Figure 4:
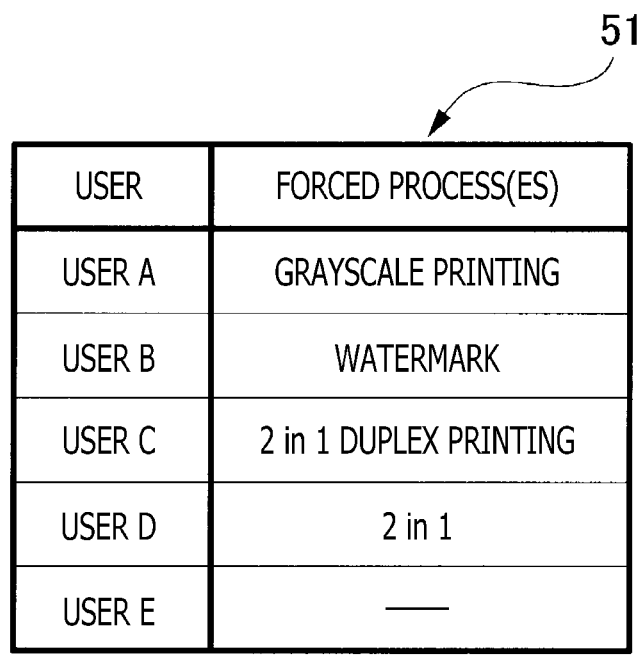
FIG. 4 shows an example of automatic setting information.

The printer 2 in the illustrative embodiment stores, in the memory thereof, the automatic setting information 51 that specifies type(s) of processing that are automatically set according to the user ID, for instance, as shown in FIG. 4. The automatic setting information 51 is information on one or more processes (hereinafter referred to as a "forced processes") that are forcibly set for a print job to be printed by the printer 2 regardless of the intention of the user who has submitted the print job. Each forced process may be a process executable by the printer 2, or may be a process inexecutable by the printer 2. A print setting for each forced process may be a setting implementable by the general-purpose print program 41, or may be a setting not implementable by the general-purpose print program 41.

Each forced process is a process that does not accept changes by the user who provides a print instruction, and is previously set, for instance, by the administrator of the printer 2. The printer 2 in the illustrative embodiment previously accepts the automatic setting information 51 input, for instance, by the administrator via an operation panel, and stores the automatic setting information in the memory of the printer 2. For instance, the printer 2 accepts the designation of the automatic setting information 51 in combination with a password for the administrator, and does not accept changes in the automatic setting information 51 unless the password is entered. When a forced process is set in the automatic setting information 51, the auxiliary programs 42 do not accept changes in the setting of the forced process even by an instruction being input by the user who provides the print instruction. Since respective different forced processes may be set for individual users as the automatic setting information 51, it is possible to cause the printer 2 to print an image to which appropriate image processing has been applied for each user.

For instance, forced processes settable in the automatic setting information 51 include watermark addition, aggregate printing such as 2-in-1, grayscale printing, and duplex printing. A forced process of watermark addition is a process to perform image processing of combining a pre-specified watermark image with an image represented by image data contained in the print job and to set the obtained composite image as a target image to be printed. For instance, when the watermark addition is set as an automatic setting for printing by the printer 2, a watermark is automatically added in response to selection of the printer 2. Thereby, the watermark addition does not need to be set when the print instruction is provided. Thus, it is possible to remarkably reduce the time and effort required by the user and to prevent the user from forgetting to add a watermark.

A forced process of aggregate printing is a process to perform image processing in which images of a predetermined number (e.g., two) of multiple pages are reduced and aggregated on a single sheet for a print job containing a plurality of pages of images and to set the aggregated images as a target image to be printed. When the aggregate printing is set as an automatic setting, it is possible to achieve more effective use of resources than when one page is printed on each single sheet.

A forced process of grayscale printing is a process to, when a setting of color printing is included in the print settings, change the setting of color printing to grayscale printing or monochrome printing and perform printing based on the changed print settings. A forced process of duplex printing is a process to, when images to be printed include a plurality of pages of images, and a setting of simplex printing is included in the print settings, change the setting of simplex printing to duplex printing and perform printing based on the changed print settings.

In response to the obtainment request in A11, the printer 2 reads out information on a forced process corresponding to the user ID added to the obtainment request from the automatic setting information 51 and sends the function information including the read information on the forced process to the PC 1 in A12. The auxiliary programs 42 obtain, from the function information received in A12, the information on the forced process that is set for the logged-in user (A21). It is noted that an explanation is provided here of a case in which the number of forced processes corresponding to the user ID added to the obtainment request is one for the sake of simplified description. However, as shown in FIG. 4, one or more forced processes may be associated with each user ID.

If the information on the forced process corresponding to the user ID added to the obtainment request is not included in the automatic setting information 51, the printer 2 may not perform the forced process. In another instance, the automatic setting information 51 may include information on a forced process corresponding to an unregistered user. In that case, if the information on the forced process corresponding to the user ID added to the obtainment request is not included in the automatic setting information 51, the printer 2 may send the information on the forced process corresponding to the unregistered user in response to the obtainment request.

When some type of forced process is set in the automatic setting information 51 in association with this user, the auxiliary programs 42 configure (change) the print settings to automatically perform that forced process (A22). Namely, the auxiliary programs 42 reflects the automatic setting information 51 in the print settings without involving the general-purpose print program 41. Further, the auxiliary programs 42 change the setting screen 100 displayed in A06 based on the automatically set forced process, and cause the user I/F 13 to display the changed setting screen 100 (A23).

Figure 5:
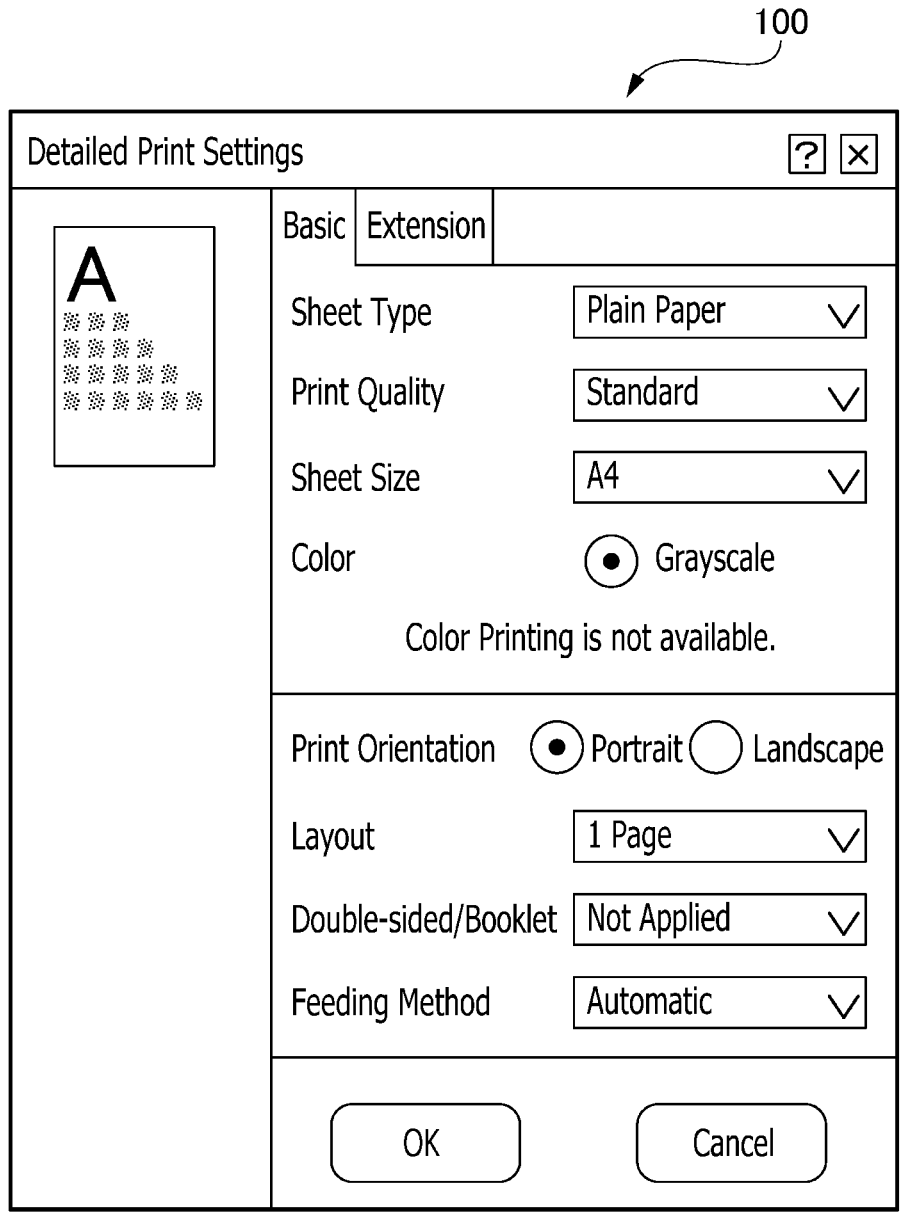
FIG. 5 shows an example of the setting screen.

For instance, in the example shown in FIG. 4, if the logged-in user is User A, the grayscale printing is set as the forced process. Therefore, the auxiliary programs 42 change the setting of color printing included in the print settings to the grayscale printing and cause the user I/F 13 to display the changed setting screen 100, for instance, as shown in FIG. 5. Further, in this case, the auxiliary programs 42 do not accept a setting change from the grayscale printing to the color printing on the setting screen 100. For instance, when 2-in-1 is set as the forced process, the auxiliary programs 42 change a layout setting in the print settings to the 2-in-1 setting and cause the user I/F 13 to display the changed setting screen 100. In this case, the auxiliary programs 42 do not accept a change in the layout setting on the setting screen 100. Thus, as setting changes in the print settings for the forced process are restricted, the user is allowed to understand that the forced process is to be performed.

Further, the auxiliary programs 42 store the information on the forced process that is set for the logged-in user in an area of the memory 12 that is usable by the auxiliary programs 42 (A24). When the forced process corresponding to the logged-in user is not set, that is, when the function information received in A12 does not include information on the forced process corresponding to the logged-in user, the auxiliary programs 42 do not execute A21 to A23. For instance, in the example shown in FIG. 4, if the logged-in user is User E, the auxiliary programs 42 do not change the print settings or change the setting screen 100 because no forced process is set for the logged-in user (i.e., User E). In this case, in A24, the auxiliary programs 42 may store the fact that no forced process is set or may not perform storing of the forced process.

The auxiliary programs 42 receive input of a user instruction for the print settings other than the forced process via the setting screen 100 being displayed. When having received an instruction to terminate configuration of the detailed settings on the setting screen 100, the auxiliary programs 42 terminate the display of the setting screen 100 and pass a termination notification to the general-purpose print program 41. Before terminating the display of the setting screen 100, the auxiliary programs 42 may store information regarding the print settings specified by the user instruction in an area of the memory 12 that is usable by the auxiliary programs 42. In response to receiving the termination notification from the auxiliary programs 42, the general-purpose print program 41 passes the termination notification to the edit application 43.

Figure 6:
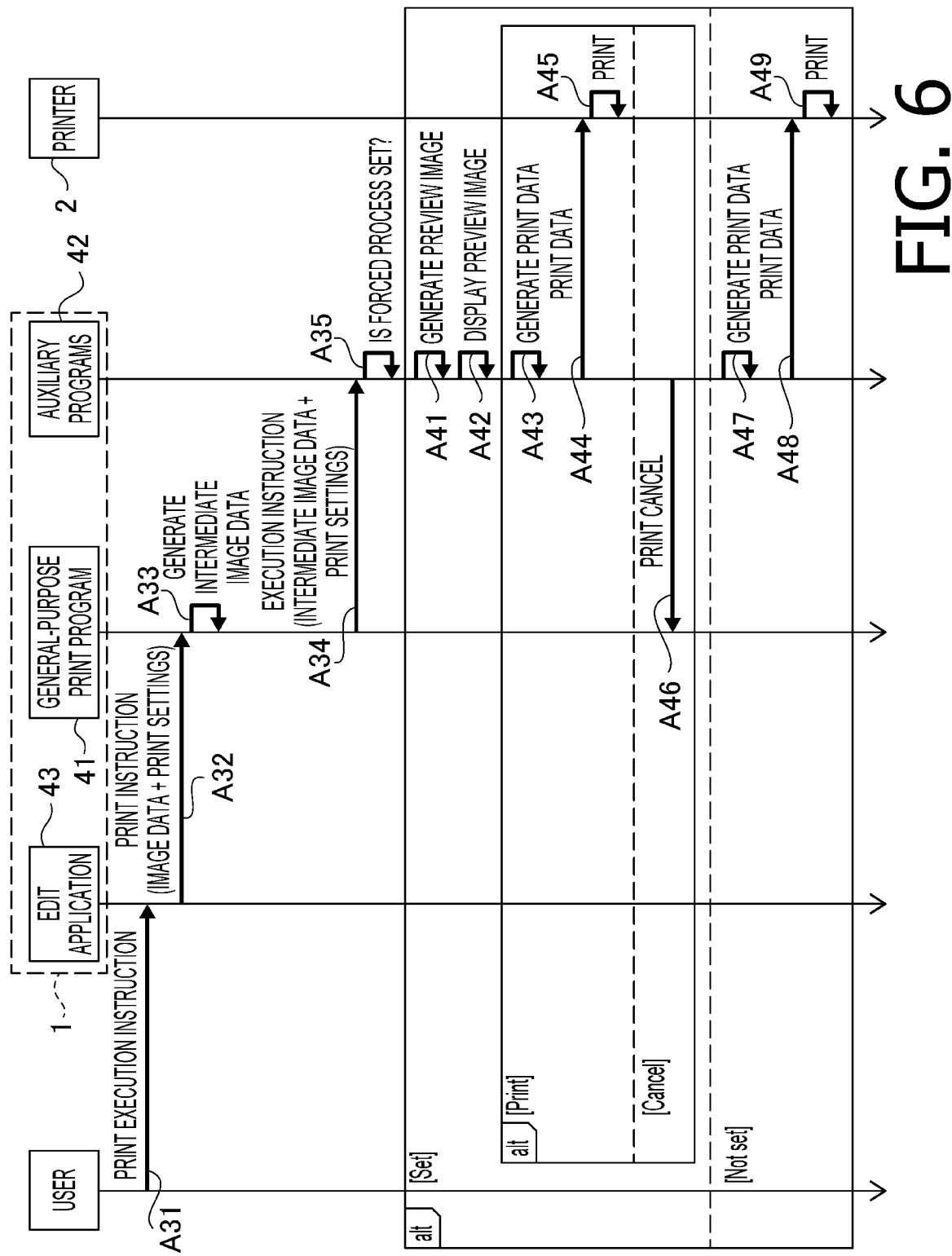
FIG. 6 is a sequence chart showing a latter part of the example procedure of the printing operations by the individual programs.

Next, with respect to the printing procedure including operations by the auxiliary programs 42 in the illustrative embodiment, a latter part thereof will be described with reference to a sequence chart in FIG. 6. FIG. 6 shows a procedure of operations to be performed after the procedure shown in FIG. 2. Namely, at the beginning of the procedure shown in FIG. 6, the information on the forced process is stored in the memory 12.

In response to receiving a print execution instruction from the user via the print screen (A31), the edit application 43 provide a print instruction to the general-purpose print program 41 (A32). The general-purpose print program 41 obtains information indicating image data of the target image to be printed and information indicating the print settings in the print instruction. The print settings contained in the information passed from the edit application 43 to the general-purpose print program 41 include print settings specified by the user who provides the print instruction, and a print setting for which the aforementioned forced process has been automatically set.

The general-purpose print program 41 generates intermediate image data by converting a format of the image data included in the received print instruction to a format of intermediate image data (A33), and generates a print job including the intermediate image data. The edit application 43 includes various types of image data. The general-purpose print program 41 converts the received image data into intermediate image data suitable for generating print data. If the image data included in the print instruction is suitable for generating print data, the image data may be used as is as the intermediate image data without being converted.

The general-purpose print program 41 further provides an execution instruction to the auxiliary programs 42 (A34), and activates the auxiliary programs 42. Through the execution instruction, the generated intermediate image data and information on the print settings are passed to the auxiliary programs 42. Namely, the auxiliary programs 42 obtains the intermediate image data from the OS 21 in A34.

Further, the auxiliary programs 42 determine whether the forced process corresponding to the logged-in user is set (A35). The auxiliary programs 42 make the determination in A35 based on the information on the forced process that has been stored in the memory 12 in A24 of FIG. 2. When A11 to A12 in FIG. 2 have not been executed, the auxiliary programs 42 communicate with the printer 2 after beginning to perform the corresponding process in response to the execution instruction from the general-purpose print program 41 in A34 and obtain the function information from the printer 2. When the PC 1 stores the automatic setting information in the memory 12 by communicating with the printer 2 while the setting screen 100 for accepting the detailed settings is being displayed, and reads out the automatic setting information from the memory 12 based on the print instruction, it is possible to complete the process after receiving the print instruction earlier than when the PC 1 communicates with the printer 2 at the timing of receiving the print instruction. On the other hand, when the PC 1 obtains the automatic setting information by communicating with the printer 2 based on the print instruction, it is possible to cause the printer 2 to perform the forced process based on the latest automatic setting information 51.

When having determined that the forced process corresponding to the logged-in user is set (alt: [Set]), the auxiliary programs 42 generate a preview image based on the information on the print settings that include the setting for which the forced process is set (A41). For instance, when the forced process is the watermark addition, the auxiliary programs 42 perform image processing to combine the specified watermark image with the intermediate image data obtained in A34. Information on the watermark image is included in the automatic setting information 51. The auxiliary programs 42 may obtain the information on the watermark image from the printer 2 in A12.

Figure 7:
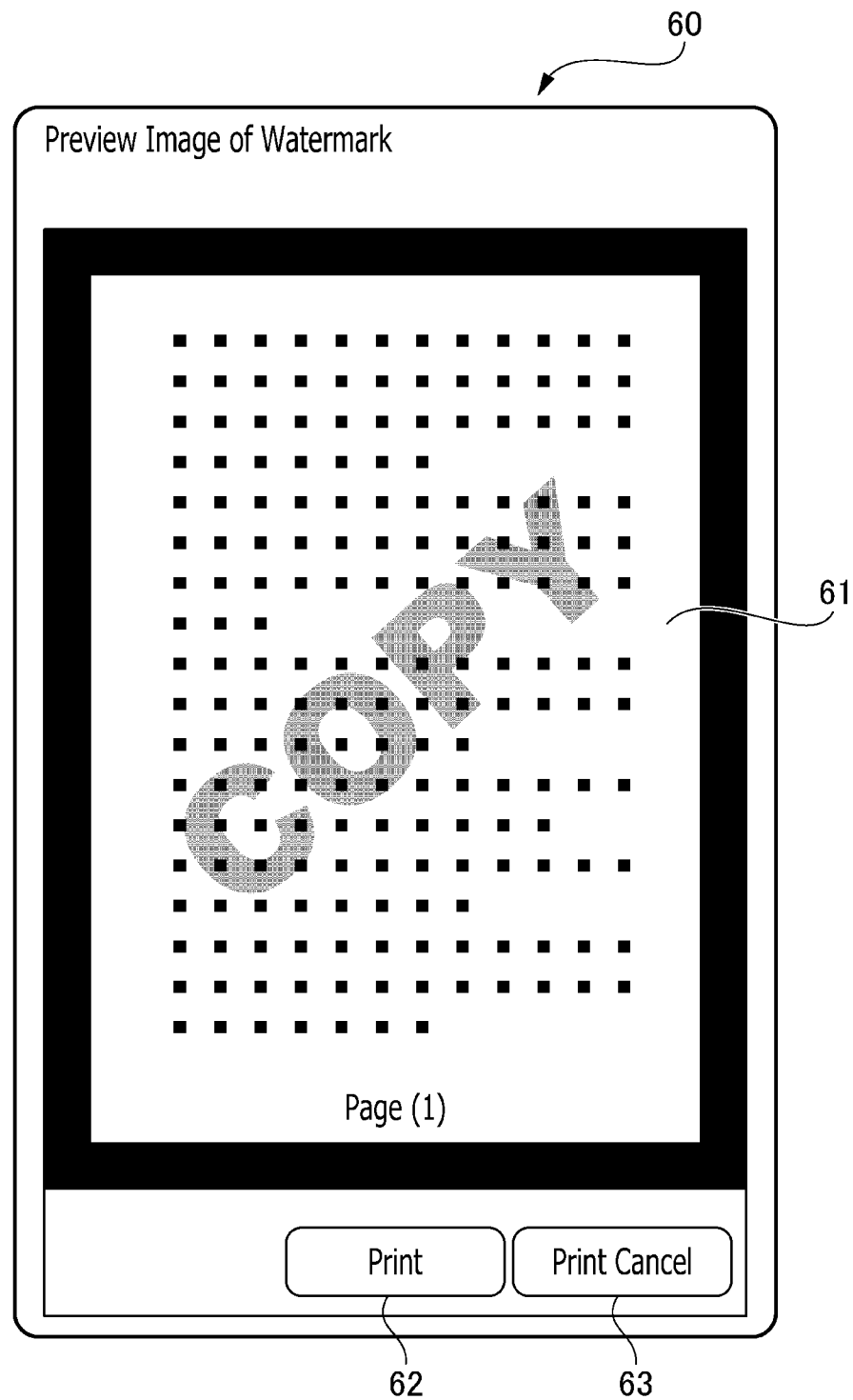
FIG. 7 shows an example of a preview screen.

The auxiliary programs 42 then perform preview display to cause the user I/F 13 to display the generated preview image (A42). For instance, the auxiliary programs 42 cause the user I/F 13 to display a preview screen 60 as shown in FIG. 7. FIG. 7 shows an example of the preview screen 60 in a case where the forced process of watermark addition is set. The preview screen 60 includes a preview image 61, a print button 62, and a print cancel button 63. The preview image 61 is a composite image in which the specified watermark image is combined with the image of the intermediate image data. Thus, as the preview image 61 after processing by the forced process is displayed, the user is allowed to confirm, in advance, a printed image on the user I/F 13 of the PC 1.

The auxiliary programs 42 then receive an operation to the print button 62 or the print cancel button 63 on the preview screen 60 being displayed. When having determined that an operation to the print button 62 has been received (alt: [Print]), the auxiliary programs 42 generate print data based on the intermediate image data of the previewed image (A43). The print data generated in A43 is data in such a format as to be usable for printing by the printer 2, and is, for instance, PDL data dedicated to the model of the printer 2.

When the print data is performed by the auxiliary programs 42 conforming to the printer 2, a higher degree of freedom is achieved, and print data suitable for printing by the printer 2 is more likely to be generated, than when the print data is generated by the general-purpose print program 41. The print data generated by the auxiliary programs 42 may be in a format usable for printing by printers other than the model of the printer 2.

Instead of the auxiliary programs 42 generating the print data, the general-purpose print program 41 may generate the print data. Namely, the auxiliary programs 42 may pass the intermediate image data of the image after image processing based on the information on the forcing process and information on the execution of printing to the general-purpose print program 41. The general-purpose print program 41 may generate print data based on the intermediate image data received from the auxiliary programs 42, and may pass the generated print data to the auxiliary programs 42.

The print data generated by the general-purpose print program 41 is print data in a format usable for printing by various types of printers, such as PWG-Raster data or PDF data. When the print data is generated by the general-purpose print program 41, the auxiliary programs 42 are responsible for less processing. Therefore, in this case, it is possible to avoid an increase in processing time and to reduce the program size of the auxiliary programs 42.

Further, the auxiliary programs 42 send the generated print data to the printer 2 together with a print command for instructing the printer 2 to perform printing (A44). The printer 2, which has received the print data and the print command, prints the image of the print data based on the received print command (A45). As a result, a printed material is generated.

The transmission of the print data and the print command to the printer 2 may be performed by the general-purpose print program 41. In other words, the auxiliary programs 42 may pass the generated print data to the general-purpose print program 41 in such a manner that the print data is to be transmitted from the PC 1 with the printer 2 as the transmission destination. The general-purpose print program 41 may send the print data received from the auxiliary programs 42 to the printer 2.

On the other hand, when having determined that an operation to the print cancel button 63 has been received on the preview screen 60 being displayed (alt: [Cancel]), the auxiliary programs 42 provides a notification that the print job be canceled to the general-purpose print program 41 (A46). Thereby, the general-purpose print program 41 cancels the print job that is based on the print instruction received in A32 and terminates the printing process. By accepting the cancellation of the print job while the preview image 61 is being displayed, it is possible to avoid printing that is not intended by the user.

When having determined that the forced process corresponding to the logged-in user is not set (alt: [Not set]), the auxiliary programs 42 generate print data based on the intermediate image data and the information on the print settings that have been received from the general-purpose print program 41 in A34 (A47), and send the generated print data to the printer 2 (A48). The printer 2 performs printing based on the received print data (A49). The processes of A47 and A48 may be performed by the general-purpose print program 41 instead of the auxiliary programs 42.

After sending the print data to the printer 2 in A44 or A48, the auxiliary programs 42 provide a notification that the transmission of the print data has been completed to the general-purpose print program 41. Thereby, the general-purpose print program 41 terminates a process of the print job based on the print instruction received in A32.

The printer 2 may have a function to rasterize the intermediate image data. If the printer 2 has the function to rasterize the intermediate image data, the auxiliary programs 42 may send to the printer 2 a print command including the intermediate image data of the target image to be printed, without generating the print data of the target image to be printed.

As described in detail above, according to the auxiliary programs 42 in the illustrative embodiment, the PC 1 obtains the information on the forced process contained in the automatic setting information 51 from the printer 2, and if the forced process corresponding to the logged-in user is set, automatically sets the corresponding print setting to the forced process. Thereby, the print setting for the forced process is automatically configured even if the user does not perform an operation to configure the print setting for the forced process when providing a print instruction. Therefore, it is possible to reduce the time and effort required for the user to configure the print setting for the forced process.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

For instance, examples of the device connected with the PC 1 are not limited to the printer 2, but may include any devices having the printing function, such as multi-function peripherals, copiers, and fax machines. The number of printers connected with the PC 1 is not limited to the example (i.e., one) shown in the aforementioned illustrative embodiment, but may be two or more.

Figure 8:
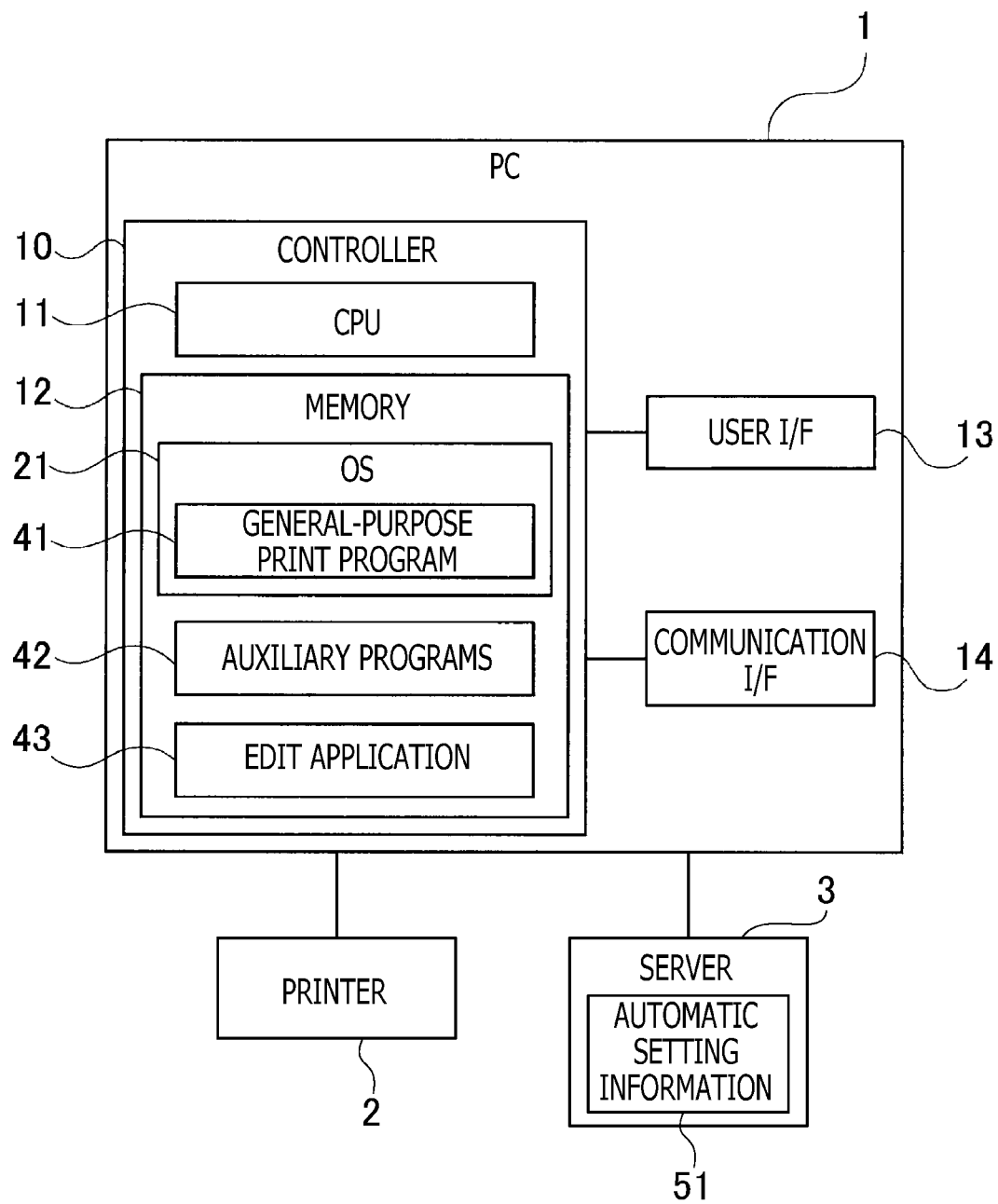
FIG. 8 is a block diagram schematically showing an electrical configuration of a PC.

Further, for instance, examples of the device from which the auxiliary programs 42 obtain the information on the forced process through the processes in A11 and A12 of FIG. 2 are not limited to the printer 2, but may include external devices such as a server communicably connected with the PC 1. For instance, as shown in FIG. 8, the PC 1 may be connected with the printer 2 and a server 3 which has the automatic setting information 51. In this case, the auxiliary programs 42 may send the obtainment request to the server 3 in A11 of FIG. 2. The server 3 may send in A12 the requested information to the PC 1 in response to the obtainment request from the PC 1, based on the automatic setting information 51 stored in the server 3. The auxiliary programs 43 may execute A21 and the subsequent steps based on the function information obtained from the server 3. Thus, when the automatic setting information 51 is managed by the server 3, the load on the memory of the printer 2 is smaller. On the other hand, when the automatic setting information 51 is managed by the printer 2, each printer is enabled to set and manage the forced process for printing by each printer itself. If the automatic setting information 51 is managed by the server 3 which is connected with a plurality of printers, the server 3 may store the automatic setting information 51 in association with information on the individual printers. In this case, the PC 1 may send the obtainment request to which the information on a printer to be used for printing is added, in A11 of FIG. 2. The server 3 may send in A12 the requested information in response to the obtainment request, based on the information on the printer that is added to the obtainment request.

All the display screens shown in the drawings are merely examples, and practicable examples of each display screen are not limited to the example shown in the aforementioned illustrative embodiment. For instance, the disposition of each image or each button shown on each display screen is not limited to the example shown in the aforementioned illustrative embodiment. The number of the image(s) or the button(s) shown on each display screen is not limited to the example shown in the aforementioned illustrative embodiment. Further, the forced processes illustrated in the aforementioned illustrative embodiment are merely examples, and are not limited to the illustrated examples. Only some of the forced processes in the illustrative embodiment may be settable, and there may be other processes that are settable as forced processes. The auxiliary programs 42 may previously have the types of processes that are settable as forced processes. The auxiliary programs 42 may be configured to accept user designation of the types of processes settable as forced processes.

In the aforementioned illustrative embodiment, the information on the forced process is stored in association with the user ID. However, practicable examples according to aspects of the present disclosure are not limited to this. For instance, the forced process may be set uniformly for all users. In this case, user information is not required to determine whether to set the forced process, and the auxiliary programs 42 do not need to obtain the user ID. Further, in A24 of FIG. 2, the auxiliary programs 42 may store the obtained information of the automatic setting information 51 as is in the memory 12, instead of storing the information in association with the individual users. Thus, it is possible to apply the common print settings to all printing processes using the printer 2. In addition, there is no need to set the information on the corresponding forced process for each user as the automatic setting information 51, thus providing a user-friendly system including the PC 1 and the printer 2.

In the aforementioned illustrative embodiment, when the information on the corresponding forced process for each user is stored as the automatic setting information 51, the auxiliary programs 42 send the obtainment request with the information on the user ID added, and the printer 2 sends the requested information corresponding to the logged-in user in response to the obtainment request. However, practicable examples according to aspects of the present disclosure are not limited to this. For instance, the printer 2 may send the automatic setting information 51 for all users in response to the obtainment request. The auxiliary programs 42 may extract the information corresponding to the logged-in user from the received automatic setting information 51. In this case, there is no need to add the information on the user ID to the obtainment request. The auxiliary programs 42 may obtain the user ID after receiving the automatic setting information 51.

In the aforementioned illustrative embodiment, the auxiliary programs 42 cause the user I/F 13 to display the preview image when the forced process corresponding to the logged-in user is set, but may not necessarily do so. However, when the preview image is displayed, the user is allowed to more easily realize that the forced process corresponding to the logged-in user is set. Further, the auxiliary programs 42 may cause the user I/F 13 to display the preview image even when the forced process corresponding to the logged-in user is not set. In the aforementioned illustrative embodiment, the PC 1 is configured to receive a print cancel instruction while the preview image is being displayed (i.e., the auxiliary programs 42 may receive an operation to the print cancel button 63 on the preview screen 60 being displayed), but may not necessarily have such a configuration.

The function information obtained by the auxiliary programs 42 in A11 may include not only the automatic setting information 51 but also, for instance, information regarding the capability of the printer 2. The auxiliary programs 42 may cause the user I/F 13 to display screens for accepting user settings based on various types of information obtained from the printer 2.

In the illustrative embodiment, only the printing operation has been described in detail as an operation by the auxiliary programs 42. However, the auxiliary programs 42 may have other additional roles. The programs for executing the processes in the illustrative embodiment are not limited to the auxiliary programs 42, but may be any programs configured to accept instructions from the OS 21 or the general-purpose print program 41 when printing is performed using the general-purpose print program 41. Examples of the programs for executing the processes according to aspects of the present disclosure may include a print workflow application (Print workflow) of which the specifications have been disclosed by Microsoft Corporation.

The timing at which the auxiliary programs 42 are executed is not limited to the example illustrated in the illustrative embodiment. For instance, the auxiliary programs 42 may be executed directly by an execution instruction from the OS 21, or may be resident programs. When the auxiliary programs 42 are resident programs, the auxiliary programs 42 may perform the aforementioned operations in response to receiving execution instructions.

In any flowchart disclosed in the illustrative embodiment, a plurality of processes in any plurality of steps may be arbitrarily changed in the execution order or may be executed in parallel, to the extent that there is no inconsistency in processing results.

The processes disclosed in the illustrative embodiment may be executed by one or more CPUs, one or more hardware elements such as ASICs, or a combination of at least two elements selected from those elements (including the CPUs and the hardware elements). The processes disclosed in the illustrative embodiment may be implemented in various aspects, such as a method and a non-transitory computer-readable storage medium storing computer-readable instructions for performing the processes.

The following shows examples of associations between elements illustrated in the aforementioned illustrative embodiment(s) and modification(s), and elements claimed according to aspects of the present disclosure. For instance, the PC 1 may be an example of an "information processing device" according to aspects of the present disclosure. The controller 10 may be an example of a "controller" according to aspects of the present disclosure. The CPU 11 may be an example of a "computer" according to aspects of the present disclosure. The CPU 11 may be an example of a "processor" according to aspects of the present disclosure. The memory 12 may be an example of a "non-transitory computer-readable storage medium" according to aspects of the present disclosure. The memory 12 may be an example of a "memory" according to aspects of the present disclosure. The user I/F 13 may be an example of a "user interface" according to aspects of the present disclosure. The communication I/F 14 may be an example of a "communication interface" according to aspects of the present disclosure. The auxiliary programs 42 may be an example of "computer-readable instructions" according to aspects of the present disclosure. The edit application 43 may be an example of an "application program" according to aspects of the present disclosure. The general-purpose print program 41 may be an example of a "general-purpose print program" according to aspects of the present disclosure. The printer 2 and the server 3 may be included in examples of an "external device" according to aspects of the present disclosure.

What is claimed is:

1. A non-transitory computer-readable storage medium storing computer-readable instructions that are executable by a computer of an information processing device and conform to a printer connected via a communication interface with the information processing device, the instructions realizing a support program that supports a general-purpose print program incorporated in an operating system of the information processing device and configured to cause the printer to perform driverless printing in cooperation with the support program, the instructions of the support program being configured to, when executed by the computer, cause the information processing device to:

obtain automatic setting information stored in an external device connected with the information processing device via the communication interface, the automatic setting information indicating whether particular processing is to be performed on a target image to be printed;

in response to a print instruction to cause the printer to print the target image being output from an application program incorporated in the information processing device to the general-purpose print program, receive execution instructions from the general-purpose print program, the execution instructions comprising intermediate image data generated by the general-purpose print program from the target image output from the application program, and information on print settings; and in response to receiving the execution instructions from the general-purpose print program, perform an automatic setting execution process to configure the print settings, the automatic setting execution process comprising determining whether the particular processing is to be performed on the target image to be printed, based on the obtained automatic setting information, and configuring the print settings to perform the particular processing on the target image to be printed in response to determining that the particular processing is to be performed on the target image.

2. The non-transitory computer-readable storage medium according to claim 1, wherein the printer is the external device and stores therein the automatic setting information, and wherein the instructions of the support program are further configured to, when executed by the computer, cause the information processing device to:

send an obtainment request for the automatic setting information to the printer, thereby causing the printer to send the automatic setting information stored in the printer to the information processing device in response to the obtainment request from the information processing device; and receive the automatic setting information from the printer, thereby obtaining the automatic setting information.

3. The non-transitory computer-readable storage medium according to claim 1, wherein in response to the automatic setting execution process configuring the print settings to perform the particular processing on the target image to be printed the instructions of the support program are configured to, when executed by the computer, cause the information processing device to display, on a user interface of the information processing device, a preview image representing the target image to be printed based on the configured print settings.

4. The non-transitory computer-readable storage medium according to claim 3, wherein the instructions of the support program are further configured to, when executed by the computer, cause the information processing device to:

receive via the user interface a selection as to whether to cancel a print job that is based on the print instruction, while the preview image is being displayed; and cancel the print job when the received selection is a selection to cancel the print job.

5. The non-transitory computer-readable storage medium according to claim 1, wherein the instructions of the support program are further configured to, when executed by the computer, cause the information processing device to:

display, on a user interface of the information processing device, a setting screen configured to receive input operations to configure the print settings;

after displaying the setting screen on the user interface, obtain the automatic setting information stored in the external device and store the obtained automatic setting information in a memory of the information processing device; and execute the automatic setting execution process.

6. The non-transitory computer-readable storage medium according to claim 5, wherein the instructions of the support program are further configured to, when executed by the computer, cause the information processing device to:

restrict setting changes in the print settings for the particular processing in the setting screen, in response to the determining that the particular processing is to be performed on the target image to be printed in the automatic setting execution process.

7. The non-transitory computer-readable storage medium according to claim 1, wherein the instructions of the support program are further configured to, when executed by the computer, cause the information processing device to:

in response to the print instruction being output from the application program to the general-purpose print program, obtain the automatic setting information stored in the external device.

8. The non-transitory computer-readable storage medium according to claim 1, wherein the external device stores one or more pieces of automatic setting information in association with respective pieces of user identification information, and wherein the instructions of the support program are further configured to, when executed by the computer, cause the information processing device to:

obtain a piece of user identification information of a specific user; and obtain, from the external device, the automatic setting information associated with the obtained piece of the user identification information.

9. The non-transitory computer-readable storage medium according to claim 1, wherein the instructions of the support program are further configured to, when executed by the computer, cause the information processing device to obtain the automatic setting information that indicates whether, as the particular processing, image processing of generating the target image to be printed with which a watermark image is combined is to be performed.

10. The non-transitory computer-readable storage medium according to claim 1, wherein the instructions of the support program are further configured to, when executed by the computer, cause the information processing device to obtain the automatic setting information that indicates whether, as the particular processing, image processing of reducing a plurality of pages of images and aggregating the reduced images on a single sheet is to be performed.

11. An information processing device comprising:
a communication interface; and
a controller including:
a processor; and a non-transitory computer-readable storage medium storing an application program, a general-purpose print program incorporated in an operating system of the information processing device, and computer-readable instructions conforming to a printer connected with the information processing device via the communication interface, the computer-readable instructions realizing a support program that supports the general-purpose print program and configured to cause the printer to perform driverless printing in cooperation with the support program, the instructions of the support program being configured to, when executed by the processor, cause the controller to:

obtain automatic setting information stored in an external device connected with the information processing device via the communication interface, the automatic setting information indicating whether particular processing is to be performed on a target image to be printed;

in response to a print instruction to cause the printer to print the target image being output from the application program to the general-purpose print program, receive execution instructions from the general-purpose print program, the execution instructions comprising intermediate image data generated by the general-purpose print program from the target image output from the application program, and information on print settings; and in response to receiving the execution instructions from the general-purpose print program, perform an automatic setting execution process to configure the print settings, the automatic setting execution process comprising determining whether the particular processing is to be performed on the target image to be printed, based on the obtained automatic setting information, and configuring the print settings to perform the particular processing on the target image to be printed in response to determining that the particular processing is to be performed on the target image.

12. A method implementable by a processor of an information processing device, the processor being configured to execute a support program having computer-readable instructions, the instructions of the support program conforming to a printer connected via a communication interface with the information processing device, the support program supporting a general-purpose print program incorporated in an operating system and is configured to cause the printer to perform driverless printing in cooperation with the support program, the method comprising:

obtaining, by the processor executing the support program, automatic setting information stored in an external device connected via the communication interface with the information processing device, the automatic setting information indicating whether particular processing is to be performed on a target image to be printed;

in response to a print instruction to cause the printer to print the target image being output from an application program incorporated in the information processing device to the general-purpose print program, activating the support program by the general-purpose print program;

receiving, by the processor executing the support program, execution instructions from the general-purpose print program, the execution instructions comprising intermediate image data generated by the general-purpose print program from the target image output from the application program, and information on print setting; and in response to receiving the execution instructions from the general-purpose print program, performing, by the processor executing the support program, an automatic setting execution process to configure the print settings, the automatic setting execution process comprising determining whether the particular processing is to be performed on the target image to be printed, based on the obtained automatic setting information, and configuring the print settings to perform the particular processing on the target image to be printed in response to determining that the particular processing is to be performed on the target image.

* * * * *